United States Patent [19]

Stewart

[11] Patent Number: 4,853,459

[45] Date of Patent: Aug. 1, 1989

[54] PREPARATION OF LINEAR POLYCARBONATES FROM CYCLIC OLIGOMER COMPOSITIONS USING METAL CHELATE CATALYST

[75] Inventor: Kevin R. Stewart, Schenectady, N.Y.

[73] Assignee: General Electric Company, Schenectady, N.Y.

[21] Appl. No.: 185,596

[22] Filed: Apr. 25, 1988

[51] Int. Cl.$^4$ .............................................. C08G 63/62
[52] U.S. Cl. ..................................... 528/371; 528/370
[58] Field of Search ................................. 528/371, 370

[56] References Cited

U.S. PATENT DOCUMENTS 4,644,053 2/1987 Brunelle et al. ..................... 528/371
4,740,583 4/1988 Brunelle et al. ..................... 528/370

OTHER PUBLICATIONS

*CRC Handbook of Chemistry & Physics*, 68th Edition (1987–1988), inside front cover.

*Primary Examiner*—Harold D. Anderson
*Attorney, Agent, or Firm*—William H. Pittman; James C. Davis, Jr.

[57] ABSTRACT

Cyclic polycarbonate oligomers are converted to linear polycarbonates by the catalytic action of a chelate of a transition metal with a ketone, diester or keto ester such as acetylacetone. The metal chelates vary in catalytic action with the position of the metal in the Periodic Table.

18 Claims, No Drawings

PREPARATION OF LINEAR POLYCARBONATES FROM CYCLIC OLIGOMER COMPOSITIONS USING METAL CHELATE CATALYST

This invention relates to the preparation of linear polycarbonates and similar condensation polymers, and more particularly to an improved method for their preparation from cyclic oligomer compositions.

The conversion of low molecular weight cyclic aromatic carbonate polymers to linear polycarbonates is known. Reference is made, for example, to the following U.S. Pat. Nos. 3,155,683; 3,386,954; 3,274,214; 3,422,119. More recently, cyclic polycarbonate oligomer mixtures and similar mixtures involving thiol analogs of the carbonates have been prepared and converted to linear polycarbonates, often of very high molecular weight, by contact with a wide variety of polycarbonate formation catalysts. Reference is made, for example, to U.S. Pat. Nos. 4,644,053 and 4,740,583, the disclosures of which are incorporated by reference herein.

The catalysts described in the above-mentioned patents include many metallic compounds, including chelates which are classed therein as Lewis acids. Upon further study, however, it has been discovered that the mechanism by which such chelates operate is most likely a nucleophilic one, involving action by the catalyst itself or an intermediate into which it is converted. Two types of nucleophilic action are possible: direct attack on a carbonyl carbon atom of the cyclic polycarbonate, and deprotonation of traces of hydroxy-terminated linear polycarbonate to form phenoxide ions which themselves attack said carbonyl carbon atom.

For the most part, the metal-containing catalysts are quite active when employed with relatively impure cyclic polycarbonates. However, upon careful purification of the cyclic polycarbonate, as by isolation of the tetramer which is often relatively easy to isolate, effective catalytic action frequently requires high temperatures and/or long reaction times. This fact suggests that the predominant avenue for nucleophilic action of such catalysts is by deprotonation, which is only possible when the necessary hydroxy-terminated species have not been removed from the cyclics.

The compounds disclosed as polycarbonate formation catalysts in the above-identified patents include bisisopropoxytitanium bisacetylacetonate and the bisisopropoxyaluminum salt of ethyl acetoacetate, both of which are metal chelates. However, they contain alkoxy radicals in addition to the chelate groups. The nucleophilic action of such compounds is easy to rationalize, since the alkoxy groups may dissociate and serve as very strong bases, both in a deprotonation sense and in the sense of attack on a carbonyl carbon atom.

The present invention is based on the discovery that a number of metal chelates which do not contain alkoxy groups are also active as catalysts for the conversion of cyclics to linear polycarbonates. These catalysts include derivatives of numerous metals in the transition metal series, and the chelates thereof are widely and predictably diverse in their polymerization activities. Thus, it is possible to choose a single catalyst from this group which will have almost any desired degree of catalytic activity, ranging from immediate and rapid polymerization at temperatures in the range of about 200°–225° C. to slow, deliberate polymerization at much higher temperatures, approaching or even exceeding 300° C.

Accordingly, the invention includes a method for preparing a resinous composition which comprises contacting, at a temperature in the range of about 200°–350° C., at least one cyclic polycarbonate oligomer with a catalytic amount of at least one metal chelate of the formula

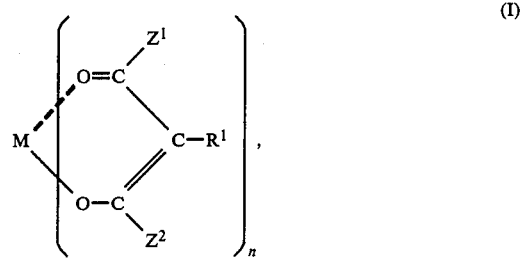

wherein:
M is a metal of the lanthanide series or of Groups 3–13—new notation—of the Periodic Table;
each $Z^1$ and $Z^2$ is independently a primary or secondary alkyl or alkoxy radical containing about 1–5 carbon atoms;
each $R^1$ is hydrogen or a primary or secondary alkyl radical containing about 1–5 carbon atoms; and
n is 2 or 3.

Also included are polymerizable compositions comprising said cyclic polycarbonate oligomers and said metal chelate.

The cyclic polycarbonate oligomer compositions useful in the method of this invention generally comprise a plurality of structural units of the formula

wherein at least about 60% of the total number of $R^2$ values are divalent aromatic organic radicals, the balance thereof being aliphatic, alicyclic or aromatic organic radicals. Such compositions include dimers, trimers and tetramers, as well as cyclic polycarbonate oligomer mixtures.

The $R^2$ values may be different but are usually the same, and may be aliphatic, alicyclic, aromatic or mixed; those which are aliphatic or alicyclic generally contain up to about 8 carbon atoms. Suitable $R^2$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^2$ radicals are hydrocarbon radicals.

Preferably at least about 80% of the total number of $R^2$ values in the cyclic oligomer mixtures, and most desirably all of said $R^2$ values, are aromatic. The aromatic $R^2$ radicals preferably have the formula $$-A^1-Y-A^2-, \qquad (III)$$

wherein each of $A^1$ and $A^2$ is a monocyclic divalent aromatic radical and Y is a bridging radical in which one or two atoms separate $A^1$ from $A^2$. The free valence bonds in formula III are usually in the meta or para positions of $A^1$ and $A^2$ in relation to Y.

In formula III, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula III is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers (if any) are present. The mixtures also usually contain low percentages, if any (frequently less than 30% and preferably no higher than about 20%) of polymers (linear or cyclic) having a degree of polymerization greater than about 30. These properties, coupled with the relatively low melting points and viscosities of the cyclic oligomer mixtures, contribute to their utility as resin precursors, especially for high molecular weight resins.

According to the present invention, conversion of the cyclic polycarbonates to linear polycarbonates is effected by contact with at least one metal chelate of formula I. The metal atom, M, in said chelate may be from the lanthanide series of metals or Groups 3–13 of the Periodic Table in the new notation. Reference is made, for example, to CRC Handbook of Chemistry and Physics, 68th Edition (1987–1988), inside front cover, for an example of this notation.

The preferred metals are from the lanthanide series or Groups 7–13 and have an atomic number in the range of 25–70. Especially preferred for many purposes, by reason of their availability and the wide spectrum of catalytic activity of the relevant chelate compounds, are aluminum, manganese, iron, cobalt, nickel, copper and cerium.

The chelate portion of the compound of formula I may be derived from one or more diketones, diesters or keto esters in which one carbon atom separates the carbonyl groups. In the diketones, $Z^1$ and $Z^2$ are both primary or secondary alkyl radicals containing about 1–5 carbon atoms, including methyl, ethyl, 1-propyl, 2-propyl, 1-butyl and 2-pentyl.

In the diesters, $Z^1$ and $Z^2$ are both alkoxy radicals containing the above-identified alkyl groups, while in the keto esters one of $Z^1$ and $Z^2$ is an alkyl radical and the other is an alkoxy radical. The preferred chelating compounds are those in which $Z^1$ and $Z^2$ are selected from methyl, ethyl, methoxy and ethoxy groups, with methyl groups being especially preferred.

The $R^1$ radical may be hydrogen or a primary or secondary alkyl radical as described hereinabove. It is most often hydrogen, methyl or ethyl, with hydrogen being preferred. Thus, the most preferred chelating compound is 2,4-pentanedione (acetylacetone).

The compounds useful as catalysts according to the invention are those in which the metal atom is divalent or trivalent. Thus, the value of n may be 2 or 3. Those skilled in the art will recognize that numerous metals described hereinabove may be either divalent or trivalent, and may be used in either valence state. The most desirable compounds for most purposes are the acetylacetonates of aluminum, divalent manganese, trivalent iron or cobalt, divalent nickel or copper or trivalent cerium.

Catalytic activities of the compounds of formula I vary according to the valency of the metal and its position in the Periodic Table. In the two series comprising divalent and trivalent metals, respectively, catalytic activity increases as one moves to the right in the Periodic Table. Thus, it is possible to select a catalyst with an activity suitable for almost any polymerization condition. This fact makes it possible to operate according to the invention in a wide variety of polymerization environments, including such operations as resin transfer molding, rotational molding, extrusion polymerization and pultrusion.

The polymerization reaction is typically conducted by merely contacting the cyclic oligomer mixture with the catalyst at a temperature in the range of about 200°–350° C., preferably about 200°–300° C., until polymerization has proceeded to the extent desired. Although a solvent may be used, it is not necessary and is frequently not preferred. It is within the scope of the invention to conduct the polymerization in a mold to produce a molded article, or in an extruder to produce a linear polycarbonate as the extrudate.

Compositions comprising cyclic oligomers of formula II and at least one of the catalysts described herein may be prepared by dissolving the cyclic composition in a suitable solvent, preferably methylene chloride, to which the catalyst species is added in the desired proportions. The solvent is then evaporated to produce an intimate blend of the catalyst with the cyclic composition. Such blend is stable at ambient temperatures but may be readily polymerized by heating to an appropriate temperature. Polymerizable compositions of this type are another aspect of the invention.

The proportion of catalyst used in the method of this invention will depend to some extent on the molecular weight of the polymer desired and the time available for completion of the polymerization reaction. Since a 'living' polymerization is involved, the molecular weight of the polymer will vary inversely with the proportion of catalyst used. On the other hand, the reaction rate varies directly with the proportion of catalyst. Therefore, as said proportion is increased, the time required for polymerization and the molecular weight of the product both decrease. Balancing these factors, it is generally found that catalyst proportions of about 0.001–0.5 mole percent, based on structural units in the oligomer, are satisfactory.

The invention is illustrated by the following examples. The cyclic polycarbonate composition used in each example was a mixture of bisphenol A cyclic polycarbonate oligomers, principally having degrees of polymerization from 2 to about 6; molar proportions thereof are in terms of carbonate units. Molecular weights were determined by gel permeation chromatography relative to polystyrene.

EXAMPLES 1–7

A series of polymerization experiments was run in a reaction vessel fitted with a stirrer maintained at a constant speed of 100 rpm., by means of a motor which compensated for increasing viscosity by proportionally and measurably increasing the current. By means of a computer, plots were made of viscosity (as determined from current input) against time and the slopes of the resulting curves at the points of maximum rate of change of viscosity were determined. These slopes were in turn converted to relative polymerization rates, using lithium phenoxide as a standard having a value of 1.00. Since the viscosities at the points of maximum rate of change corresponded to a polymer level of only about 35–40% high molecular weight material, only the early part of each reaction was considered in this portion of the experiment.

In each example, a 50-gram portion of cyclic polycarbonate oligomers was heated and stirred for a period of time sufficient to establish that no polymerization was taking place. A sample of metal acetylacetonate in the amount of 0.1 mole percent was then added and stirring was continued as the viscosity data were taken and until the reaction was complete. The weight and number average molecular weights of the resulting linear polycarbonates were then determined. The results are given in Table I.

TABLE I

| Example | Acetylacetonate | Relative rate | Mw | Mn | Mw/Mn |
|---|---|---|---|---|---|
| 1 | Cerium(III) | 0.30 | 96,300 | 46,100 | 2.1 |
| 2 | Iron(III) | 2.24 | 134,900 | 62,000 | 2.2 |
| 3 | Cobalt(III) | 2.55 | 25,300 | 12,700 | 2.0 |
| 4 | Aluminum | 3.43 | 41,300 | 19,600 | 2.1 |
| 5 | Manganese(II) | 0.15 | 101,700 | 52,000 | 2.0 |
| 6 | Nickel(II) | 0.87 | 55,600 | 25,700 | 2.0 |
| 7 | Copper(II) | 1.43 | 173,800 | 94,900 | 1.8 |

It will be seen that the rate of reaction increases, in both the trivalent and divalent series, as one moves from left to right in the Periodic Table.

EXAMPLES 8–10

Intimate mixtures of 500 grams of cyclic polycarbonate oligomers and 0.1 mole percent of various initiators were charged to a Helicone reactor, liquefied in an argon atmosphere and stirred at 240° C. until polymerization was complete. The times required for completion are given in Table II.

TABLE II

| Example | Acetylacetonate | Time, min. |
|---|---|---|
| 8 | Cerium(III) | 90 |
| 9 | Aluminum | 15 |
| 10 | Nickel(II) | 45 |

What is claimed is:

1. A method for preparing a resinous composition which comprises contacting, at a temperature in the range of about 200°–350° C., at least one cyclic polycarbonate oligomer with a catalytic amount of at least one metal chelate of the formula

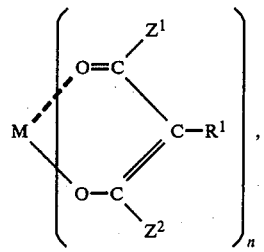

wherein:

M is a metal of the lanthanide series or of Groups 3–13 of the Periodic Table, in the new notation as defined in *CRC Handbook of Chemistry and Physics*, 68th Edition (1987–88), inside front cover;

each Z1 and Z2 is independently a primary or secondary alkyl or alkoxy radical containing about 1–5 carbon atoms;

each R1 is hydrogen or a primary or secondary alkyl radical containing about 1–5 carbon atoms; and n is 2 or 3.

2. A method according to claim 1 wherein each of $Z^1$ and $Z^2$ is methyl, ethyl, methoxy or ethoxy and $R^1$ is hydrogen.

3. A method according to claim 2 wherein the cyclic polycarbonates comprise a plurality of structural units of the formula

wherein at least about 60% of the total number of $R^2$ values are divalent aromatic organic radicals, the balance thereof being aliphatic, alicyclic or aromatic organic radicals.

4. A method according to claim 3 wherein each $R^2$ radical has the formula

wherein each of $A^1$ and $A^2$ is a monocyclic divalent aromatic radical and Y is a bridging radical in which one or two atoms separate $A^1$ from $A^2$.

5. A method according to claim 4 wherein M is a metal of the lanthanide series or Groups 7–13 and has an atomic number in the range of 25–70.

6. A method according to claim 5 wherein the metal chelate is present in the amount of about 0.001–0.5 mole percent, based on structural units in the oligomer composition.

7. A method according to claim 6 wherein $A^1$ and $A^2$ are each p-phenylene and Y is isopropylidene.

8. A method according to claim 7 wherein M is divalent manganese, nickel or copper.

9. A method according to claim 7 wherein M is trivalent iron, cobalt, cerium or aluminum.

10. A polymerizable composition comprising cyclic polycarbonate oligomers comprising structural units of the formula

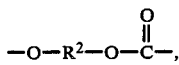
(II)

wherein at least about 60% of the total number of $R^2$ values are divalent aromatic organic radicals, the balance thereof being aliphatic, alicyclic or aromatic organic radicals; and at least one metal chelate of the formula

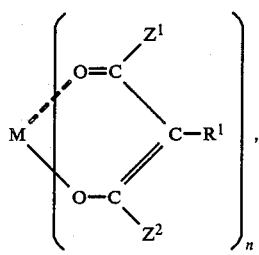
(I)

wherein:
M is a metal of the lanthanide series or of Groups 3–13—new notation—of the Periodic Table;
each $Z^1$ and $Z^2$ is independently a primary or secondary alkyl or alkoxy radical containing about 1–5 carbon atoms;
each $R^1$ is hydrogen or a primary or secondary alkyl radical containing about 1–5 carbon atoms; and
n is 2 or 3.

11. A composition according to claim 10 wherein each of $Z^1$ and $Z^2$ is methyl, ethyl, methoxy or ethoxy and $R^1$ is hydrogen.

12. A composition according to claim 11 wherein the cyclic polycarbonate comprise a plurality of structural units of the formula

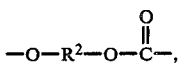
(II)

wherein at least about 60% of the total number of $R^2$ values are divalent aromatic organic radicals, the balance thereof being aliphatic, alicyclic or aromatic organic radicals.

13. A composition according to claim 12 wherein each $R^2$ radical has the formula

(III)

wherein each of $A^1$ and $A^2$ is a monocyclic divalent aromatic radical and Y is a bridging radical in which one or two atoms separate $A^1$ from $A^2$.

14. A composition according to claim 13 wherein M is a metal of the lanthanide series or Groups 7–13 and has an atomic number in the range of 25–70.

15. A composition according to claim 14 wherein the metal chelate is present in the amount of about 0.001–0.5 mole percent, based on structural units in the oligomer composition.

16. A composition according to claim 15 wherein $A^1$ and $A^2$ are each p-phenylene and Y is isopropylidene.

17. A composition according to claim 16 wherein M is divalent manganese, nickel or copper.

18. A composition according to claim 16 wherein M is trivalent iron, cobalt, cerium or aluminum.

* * * * *